United States Patent [19]

Forshee

[11] 4,228,738
[45] Oct. 21, 1980

[54] CONVEYOR TROLLEY CONSTRUCTION

[76] Inventor: David J. Forshee, 350 Lakes Edge Dr., Oxford, Mich. 48051

[21] Appl. No.: 944,806

[22] Filed: Sep. 22, 1978

[51] Int. Cl.³ .............................................. B61B 3/00
[52] U.S. Cl. .................................... 104/95; 16/94 R; 198/687; 248/548
[58] Field of Search ...................... 104/89, 91, 94, 95, 104/172 S; 105/148, 154, 155; 198/477, 683, 684, 685, 687; 16/90, 94 R; 308/18; 248/548

[56] References Cited

U.S. PATENT DOCUMENTS

| 1,761,973 | 6/1930 | Daubner | 248/548 |
| 2,073,131 | 3/1937 | Webb | 198/687 |
| 2,075,261 | 3/1937 | Bishop | 198/687 |
| 2,101,951 | 12/1937 | McInnis | 198/687 |
| 2,843,872 | 7/1958 | Hannon | 16/94 R |
| 3,107,947 | 10/1963 | Hulterstrum | 308/18 |
| 3,268,062 | 8/1966 | Gladstone | 104/95 |
| 3,926,303 | 12/1975 | McCall | 104/95 |

FOREIGN PATENT DOCUMENTS 1418823 12/1975 United Kingdom ..................... 248/548

Primary Examiner—John J. Love
Assistant Examiner—Ross Weaver
Attorney, Agent, or Firm—Benjamin W. Colman

[57] ABSTRACT

A conveyor trolley structure made of a plastic super tough nylon material comprises a pair of arms each supporting a wheel for rotation and bearing upon the flanges of an I-beam monorail. A pendant member is secured to and between the lower ends of the arms. Metal screws are used to hold the depending member to the arms and to secure stub axles for the trolley wheels to their arms.

19 Claims, 10 Drawing Figures

CONVEYOR TROLLEY CONSTRUCTION

BACKGROUND OF THE INVENTION

Heretofore, conveyor chain driven trolleys have been made of steel and metallic components requiring considerable and expensive lubrication installations and maintenance. Such trolleys are of very substantial weight, adding materially to the load on the conveyor and consequent high energy consumption, having a relatively short service life before replacement is required, readily subject to corrosion and early failure in certain chemically active environments, and having other limitations which the instant invention avoids.

Among the advantages achieved by the conveyor trolley structure of this invention are a. The coefficient of friction of the plastic material used in the trolley components is extremely low and thus lubrication of the moving parts is not required. This feature also eliminates expensive lubrication equipment, facilities, installations and maintenance. In addition, in some applications, as for instance in food processing plants, the elimination of lubricants removes the possibility of such contaminants dripping upon processed foods carried by or disposed under the conveyor system.

b. There is a weight reduction of about 80% or more for the new plastic trolleys, in comparison to the currently used steel trolleys. This weight reduction not only extends the wear life of the monorail itself and the service life of the entire conveyor system, it will also lower the size requirements for the drive motors and mechanism with consequent reduction in energy consumption. The current service life of steel trolley conveyor systems is estimated to be from about 5 to 7 years. The inventive plastic trolley construction should at least double the service life of the monorail system.

c. The plastic trolley construction of this invention is extremely advantageous in areas where severely corrosive chemical vapors are present, such for example where caustic wash solutions are sprayed, causing a breakdown in lubrication which in turn destroys the roller bearings in the present steel trolley assemblies. The same results occur in the presence of phosphate solutions. Millions of dollars are being spent to automatically lubricate overhead monorail conveyor systems and to seal off the trolley assemblies while they pass through these severely corrosive areas.

d. By virtue of its design, the inventive trolley construction permits lower replacement cost for any component. This is not true for the presently used steel assemblies. For example, if a steel ball bearing trolley wheel should fail, not only the wheel but the entire side arm must be replaced. In the instant invention, the individual unitary components are simply and readily replaceable, at a very substantially lower cost.

e. Because of the low coefficient of friction for the plastic pendant member secured to the trolley arms, the holes in these pendants, from which the trolley hanger rods are secured by metal screws, will not become elongated due to wear. If the pendant becomes overstressed, it will simply break at the hole.

f. The plastic trolley construction effects a tremendous reduction in decible readings for the conveyor zone, a great advantage in terms of noise abatement and/or pollution. Overhead steel trolley monorail installations, particularly if they are old, become extremely noisy due to mismatches in weld joints along the I-beam monorail.

The plastic trolley construction has some additional advantages.

(1) The super tough nylon plastic resin allows for engineering a precision assembly. No secondary drilling of holes or alignment of details need be performed prior to attaching the trolleys to the monorail.

(2) Color coding of the plastic trolley assemblies will enable part identification to be more readily made on mixed model conveyor installations. Also, the assemblies can be colored brightly to signal a moving object, even though color coding may not be required under OSHA specifications.

(3) By manufacturing these trolley assemblies of plastic, a weak link in the assembly can, for the first time, be engineered into the product. Presently, all steel trolley assemblies are exceptionally strong, so that when the monorail parts hangers, attached to the male or female pendants of these steel trolleys, engage adjacent non-moving structures, vast amounts of damage occur in the entire system. For example, damage has occurred in the automation system; screen guards have been torn loose; parts hangers are bent; the I-beam monorail is often bent; parts washer manifolds are broken, bent or mutilated; excessive stress loads are transferred to the overhead conveyor-supporting superstructure; etc. etc. By making the trolley assemblies of a suitable plastic material, the male or female pendant member of the assembly can be engineered to fail at a given stress load, becoming the weak link and substantially eliminating the damage listed above. In such event, the only item of the conveyor system requiring replacement would be the inexpensive male or female pendant member.

(4) By designing the trolley assembly of the moldable Zytel ®ST 801 plastic nylon material, the trolley arms, stub axle, wheels and pendant member are each engineered to be readily replaceable in minutes, resulting in minimum downtime of the conveyor system.

The Zytel ®ST 801 plastic nylon material, used in the fabrication of applicant's trolley assembly components, is a super tough nylon resin material produced by E. I. DuPont de Nemours & Co. (Inc.) of Wilmington, Delaware 19898. This plastic resin can be mixed with a fiber glass concentrate to add further strength to the nylon material. The amount of such fiber glass additive is proportional to the weight load of the conveyor trolley assembly. As the load or weight requirements of the trolley assembly increase, the percentage of fiber glass used with the nylon resin is also increased.

SUMMARY

The invention involves a conveyor trolley construction comprising a pair of plastic trolley arms arranged in opposed facing relationship, a plastic roller or trolley wheel removably mounted for free rotation upon a plastic stub axle removably secured to the inner face of each trolley arm, and a depending plastic member removably secured to the lower ends of the trolley arms therebetween.

The rollers or trolley wheels are designed to run upon the lower or upper horizontal flanges of a conveyor-type I-beam monorail. The stub axles supporting the trolley wheels for rotation thereon are removably secured to the trolley arms by screws passed through openings in the arms from their outer sides. The plastic depending member, designed for suspending a parts hanger therefrom, is disposed between and secured to the lower portions of the trolley arms and below the I-beam flanges, by screws. The conveyor drive chain, formed of a series of links, engage and are connected to the depending member to draw the trolley assembly along and upon the monorail flanges.

BRIEF DESCRIPTION OF THE DRAWINGS

Various further and more specific objects, features and advantages of the invention will appear from the description given below, taken in connection with the accompanying drawings, illustrating by way of example preferred forms of the invention. Reference is here made to the drawings annexed hereto and forming an integral part of this specification, in which.

DESCRIPTION OF THE PREFERRED EMBODIMENTS

Figure 1:
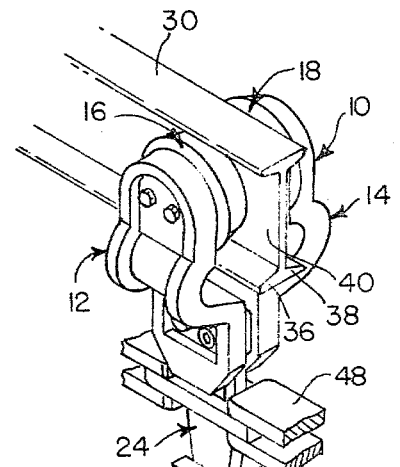
FIG. 1 is a perspective view of the conveyor trolley construction embodying a preferred form of the invention.
Figure 2:
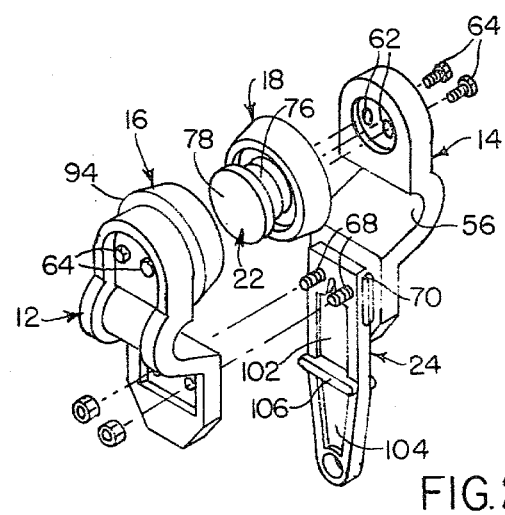
FIG. 2 is an exploded perspective view of the embodiment illustrated in FIG. 1.
Figure 3:
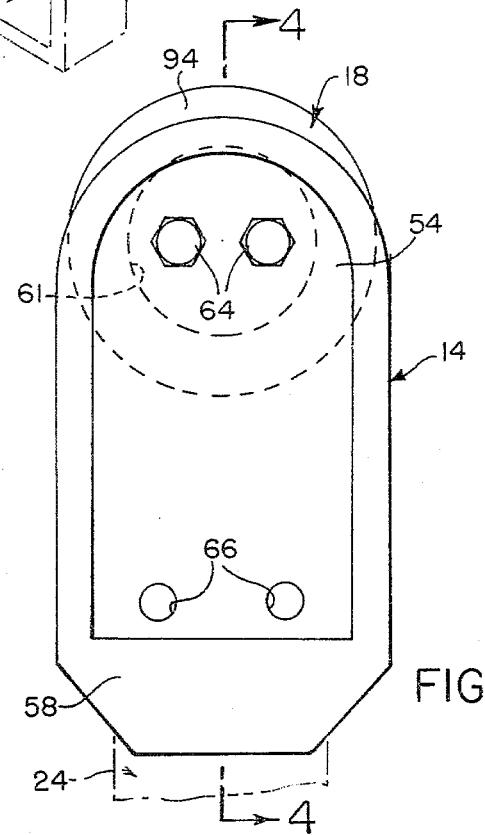
FIG. 3 is a front or outer elevational view of the trolley arm and wheel assembly.

As illustrated in the several views of the drawings, the conveyor trolley construction 10 comprises a pair of trolley arms 12, 14 (left-and right-hand), a pair of trolley wheels 16, 18 for the respective trolley arms, a pair of stub axles 20, 22 for the respective wheels, and a pendant member 24.

Figure 4:
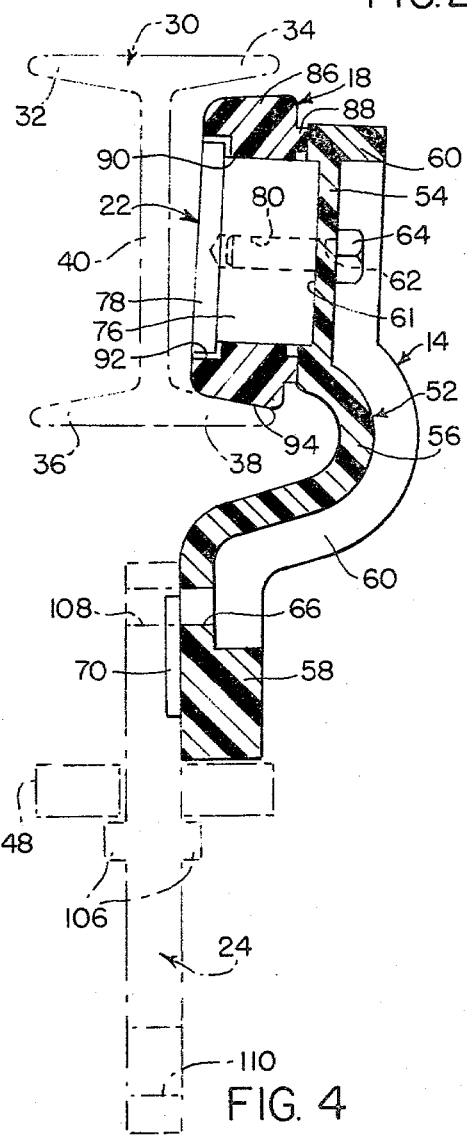
FIG. 4 is a vertical sectional view of the trolley arm taken substantially on the line 4—4 of FIG. 3.
Figure 5:
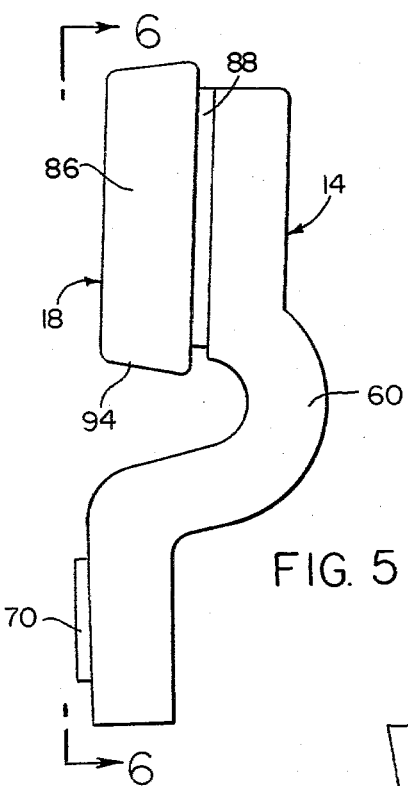
FIG. 5 is a side elevational view of the trolley arm and wheel assembly illustrated in FIGS. 3 and 4.
Figure 6:
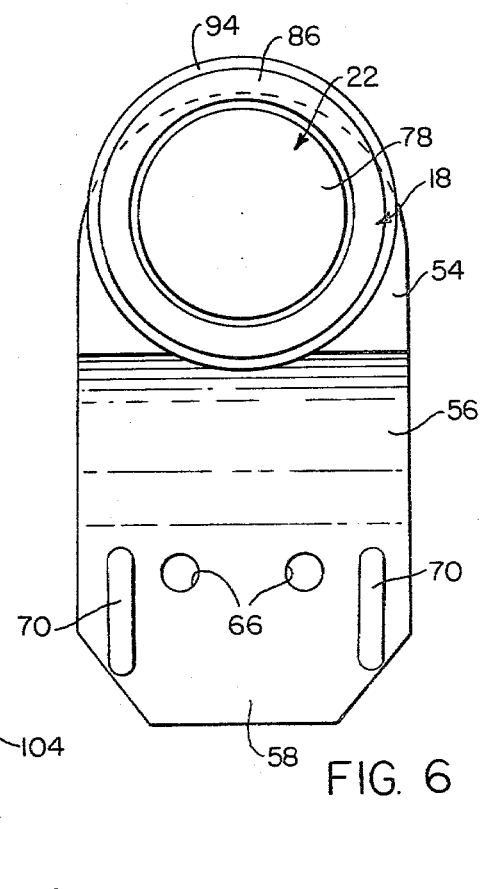
FIG. 6 is an elevational view of the arm and wheel assembly taken substantially on line 6—6 of FIG. 5.

The trolley assembly 10 is designed to operate upon an I-beam monorail 30 having upper horizontally disposed flanges 32, 34 and lower horizontally disposed flanges 36, 38, and a vertical web 40 therebetween. The inner surfaces of these flanges are disposed at a slight angle to the horizontal plane, as shown in FIGS. 1 and 4. The outer surface of the trolley wheels engaging the monorail flange surfaces, the axial attitute of the stub axle and the vertical attitude of that portion of the trolley arm supporting the stub axle and the trolley wheel are canted outwardly to compensate for the angle of those flange surfaces.

The trolley assemblies 10 are propelled along the monorail 30 by a conventional conveyor drive chain 48 having links which engage the trolley assembly at the pendant member 24.

The trolley arms 12, 14 are substantially identical so that they can be used as either a left-hand or right-hand element. The arm comprises a body 52 having an outwardly canted stub axle support portion 54, an intermediate web section 56, a lower pendant portion 58, and a peripheral rim or flange 60. The axle support portion 54 is provided with a recess or counterbore 61 to seat the stub axle 20, 22. A pair of holes 62, 62 are disposed through the axle support portion 54 for screws 64, 64 which engage and secure the stub axle 20, 22 to the body support portion 54. The pendant portion 58 is also provided with a pair of holes 66, 66 through which screws 68, 68 are passed to secure the pendant member 24 therebetween. The inner surface of the trolley arms 12, 14 in the pendant portion 58 is provided with a pair of outwardly projecting spaced apart flanges or ribs 70, 70 that engage the pendant member 24 laterally and prevent it from rotation about the screws 68, 68.

The stub axles 20, 22 are substantially identical and each comprises a hub section 76 and a radially outwardly extending flange 78. The hub section is provided with a pair of threaded holes 80, 80 to receive and engage the screws 64, 64 passed through the axle support portion holes 62, 62.

The trolleys wheels 16, 18 are substantially identical and each comprises a body 86, an annular flange 88 on its rearward side, a bore 90 for the stub axle hub portion 76, and a counterbore 92 for the stub axle outer flange 78. The outer annular surface 94 of the wheel is tapered so as to fairly rest and ride upon the upper surfaces of the monorail flanges 36, 38 and the lower surfaces of flanges 32, 34. The stub axle hub portion 76 functions as a bearing for the wheel bore 90. Since the frictional coefficient of the Zytel ®ST 801 nylon material is so very low, no additional bearing element or material is required.

The pendant member 24 (FIGS. 7, 8) comprises an upper body portion 102, a lower portion 104 and a pair of outwardly projecting ribs 106, 106 in parallel and diametrically opposing relationship intermediate the upper and lower portions 102, 104. The upper portion 102 is provided with a pair of transverse holes 108, 108 to receive and pass screws 68, 68 therethrough, the upper portion being disposed between and adjacent the ribs 70, 70 of the pendant portions 58 of the trolley arms 12, 14 which secure the pendant member 24 therebetween. The engaging link members of the conveyor drive chain 48 encircle and engage the upper pendant portion 102 above the transverse ribs 106, 106 and below the trolley arm pendant portions 58, 58. The lower pendant portion 104 is provided with a hole or bore 110 to receive a screw, pin or other suitable means by which the yoke portion of a material handling device such as a hanger rod 112 is removably secured to the trolley assembly 10.

Figure 7:
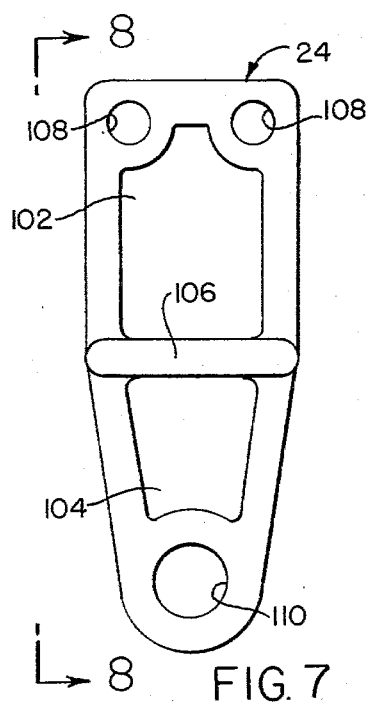
FIG. 7 is an elevational view of the trolley pendant member illustrated in FIGS. 1 and 2.
Figure 8:
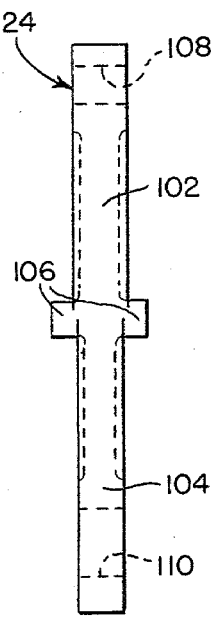
FIG. 8 is an edge view taken substantially on the line 8—8 of FIG. 7.
Figure 9:
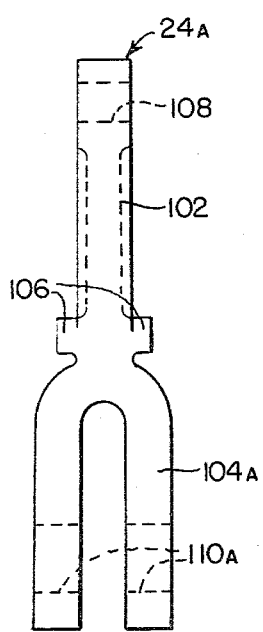
FIG. 9 is an edge view, similar to FIG. 8, illustrating an alternate form of the trolley pendant member.

FIG. 9 illustrates a female pendant member 24a which, in front elevation, is substantially the same as the male pendant member 24 shown in FIG. 7. In side elevation, FIG. 9, it will be noted that there are a pair of spaced apart yoke-type lower portions 104a, 104a each having a hole or bore 110a to receive a fastener element for securement of the male portion of a material handling device 112 thereto.

Figure 10:
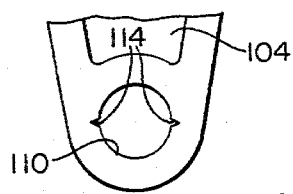
FIG. 10 is a fragmentary elevational view of a slightly modified form of the pendant member, embodying a controlled "weak link" or failure feature.

A modification of the pendant member 24 or 24a is illustrated in FIG. 10. To make the pendant member the "weak link" in the trolley assembly, whereby a minimum of damage will ensue upon hang-up of the conveyor system, a pair of opposed notches 114, 114 are disposed in the bore 110 or 110a, to allow a predetermined shear of the lower portion 104 at the notches.

In assembling the conveyor trolley 10 for operation, the upper portion 102 of the pendant member 24 or 24a is first passed through the drive chain linkage until the intermediate ribs 106, 106 abut the drive chain link. The trolley arms 12, 14 with wheels 16, 18 secured to their respective stub axles 20, 22 are then attached to the pendant member on each side thereof by screws 68, 68, with wheels 16, 18 resting upon the upper surfaces of the I-beam monorail flanges 36, 38. When thus assembled, the trolley unit 10 is ready for suspension of and attachment to a hanger device 112 at the pendant member opening 110. To disengage the trolley assembly 10 from the monorail, screws 64, 64 at each of the trolley arms are removed from its stub axle, allowing the wheels and stub axles to simply part from the arms.

Each of the components of the trolley structure 10 are molded of the Zytel®ST 801 nylon material, except the screws which secure the component elements together. These screws, preferably of metal, may also be made of a suitable plastic material to meet the needs of certain applications.

Having disclosed herein certain particular preferred embodiments of the invention for purposes of explanation, further modifications of variations thereof, after study of this specification, will or may occur or become apparent to persons skilled in the art to which the invention pertains. Reference should be had to the appended claims in determining the scope of the invention.

I claim:

1. In a trolley assembly for operation in an I-beam monorail conveyor system, the combination comprising
   a pair of spaced apart unitary integrally formed molded plastic trolley arms, each trolley arm having an upper portion, a lower portion and an intermediate web portion,
   a pair of unitary integrally formed molded plastic stub axles, each stub axle being easily removably attached to one said trolley arm, upon and adjacent the inward face of said upper portion,
   a pair of unitary integrally formed molded plastic trolley wheels, each wheel being removably supported for rotation on and retained by said stub axle on the inward side of said trolley arm upper portion,
   removable fastening means extending through said upper portion from its outer side and into said stub axle fixedly securing said stub axle against rotation to said upper portion inward face,
   and a parts carrying pendant member removably secured to and between the lower portions of said trolley arms.

2. The trolley combination defined in claim 1, wherein
   said trolley arm further comprises a body and a peripheral outwardly extending rim or flange.

3. The trolley combination defined in claim 1, wherein
   said trolley arm upper portion is provided with a recess on its inward side to receive and seat said stub axle therewithin.

4. The trolley combination defined in claim 1, and including
   means on the inward side of said trolley arm lower portion engaging said pendant member to limit rotation thereof.

5. The trolley combination defined in claim 4, wherein
   said engaging means comprises a pair of spaced apart outwardly extending flanges or ribs locating said pendant member therebetween.

6. The trolley combination defined in claims 1 or 4, and including
   means for removably securing and fastening said trolley arms lower portions to each other about a portion of said pendant member therebetween.

7. The trolley combination defined in claims 1 or 3, wherein
   said stub axle comprises a hub portion and an annular radially outwardly extending flange at the distal end of said hub portion,
   the proximal end of said hub portion being secured to and upon said trolley arm upper portion.

8. The trolley combination defined in claim 7, wherein
   said stub axle hub portion functions as a support bearing for said trolley wheel.

9. The trolley combination defined in claim 7, wherein
   said annular outwardly extending flange functions as a retainer for said trolley wheel.

10. The trolley combination defined in claim 1, and including
    means in said stub axle hub portion engagable by said fastening means to removably secure said stub axle to said trolley arm upper portion.

11. The trolley combination defined in claim 7, wherein
    said trolley wheel comprises
    a body having a tapered peripheral surface and an annular flange projecting rearwardly from the proximal side of said body.

12. The trolley combination defined in claim 11, wherein
    said wheel body is counterbored on its distal side to receive said stub axle annular flange, and bored to complement said stub axle hub portion.

13. The trolley combination defined in claim 1, wherein
    said pendant member comprises
    a unitary integrally formed molded plastic component having an upper portion, a lower portion and an intermediate transverse rib portion.

14. The trolley combination defined in claim 13, wherein
    said pendant member upper portion is secured to and between said trolley arms lower pendant portions and above said intermediate rib portion.

15. The trolley combination defined in claim 13, wherein
    said pendant member lower portion embodies means by which material handling devices are removably secured to said lower portion.

16. The trolley combination defined in claim 13, wherein
    said pendant member lower portion comprises a male form single element.

17. The trolley combination defined in claim 13, wherein
    said pendant member lower portion comprises a yoke form duplex element.

18. The trolley combination defined in claim 15, wherein
    said means comprises an opening transversely through said pendant member lower portion and means integrally formed in said lower portion communicating with said opening to provide a weakened factor of predetermined stress-load value.

19. The trolley combination defined in claim 18, wherein
    said weakened factor means comprises a pair of notches adjacent and communicating with said opening on either side thereof and substantially in a plane.

* * * * *